United States Patent
Van De Vrande et al.

(10) Patent No.: US 8,553,969 B1
(45) Date of Patent: Oct. 8, 2013

(54) SYSTEMS AND METHODS FOR COUNTING AND PROCESSING PLIABLE OBJECTS

(75) Inventors: Christopher Van De Vrande, Kingston (CA); Guillaume Carrier, Belleville (CA); Rajesh Kumar Singh, Deerfield, OH (US)

(73) Assignee: The Procter and Gamble Company, Cincinnati, OH (US)

( * ) Notice: Subject to any disclaimer, the term of this patent is extended or adjusted under 35 U.S.C. 154(b) by 23 days.

(21) Appl. No.: 13/419,111

(22) Filed: Mar. 13, 2012

(51) Int. Cl.
G06K 9/00 (2006.01)
G06K 9/46 (2006.01)

(52) U.S. Cl.
USPC .......................................... 382/141; 382/192

(58) Field of Classification Search
USPC .................................. 382/141–152
See application file for complete search history.

(56) References Cited

U.S. PATENT DOCUMENTS

| | | | |
|---|---|---|---|
| 5,408,537 A * | 4/1995 | Major ........................... | 382/141 |
| 5,751,853 A | 5/1998 | Michael | |
| 5,859,698 A * | 1/1999 | Chau et al. .................. | 356/237.2 |
| 5,917,934 A * | 6/1999 | Chiu et al. ..................... | 382/149 |
| 6,130,959 A | 10/2000 | Li | |
| 6,154,561 A * | 11/2000 | Pratt et al. ..................... | 382/141 |
| 6,404,910 B1 * | 6/2002 | Ungpiyakul et al. .......... | 382/141 |
| 6,714,679 B1 | 3/2004 | Scola et al. | |
| 6,888,083 B2 * | 5/2005 | Hergeth ........................ | 209/576 |
| 6,944,324 B2 * | 9/2005 | Tran et al. ..................... | 382/143 |
| 6,947,588 B2 * | 9/2005 | Sim ............................... | 382/149 |
| 2002/0118873 A1 * | 8/2002 | Tran et al. ..................... | 382/143 |
| 2006/0115142 A1 * | 6/2006 | Sim ............................... | 382/145 |

* cited by examiner

*Primary Examiner* — Alex Liew
(74) *Attorney, Agent, or Firm* — Andrew J. Hagerty; Megan C. Hymore

(57) ABSTRACT

Systems and methods for counting and processing pliable objects are disclosed. A vision system may capture an inspection image of a plurality of pliable objects. The inspection image may be partitioned into a plurality of windows traversing the inspection image. For each individual window of the plurality of windows, a blob extraction process is performed to determine a plurality of blobs corresponding to regions within the inspection image having substantially the second luminance value range such that the plurality of blobs correspond to the plurality of pliable objects. The blobs are counted for each window to determine a total number of pliable objects in the plurality of pliable objects.

20 Claims, 11 Drawing Sheets

SYSTEMS AND METHODS FOR COUNTING AND PROCESSING PLIABLE OBJECTS

FIELD OF THE INVENTION

Embodiments of the present disclosure relate generally to systems and methods for counting pliable objects. More particularly, pliable objects are counted using a vision system incorporating a blob extraction process.

BACKGROUND OF THE INVENTION

Multiple hygienic articles, such as feminine hygiene products (e.g., pantiliners or pads), disposable diapers, pull-ons, training pants, and adult incontinence articles, are often provided in a stack that is maintained within a package, such as a carton or a bag. Consumers expect that the total number of hygienic articles that is printed on the package are actually included in the package. Conventionally, a checkweigher is used to weigh the packages, and based on a floating average target weight, the package is deemed whether or not to have a sufficient count of pads within it. Unfortunately, raw material weight variation is too great for checkweighing to be a reliable count verification method.

An alternative method of verifying the number of hygienic articles within a package is to use a stack counting vision system, which inspects the stack of hygienic articles immediately before it is loaded into the package. Thus, depending on the inspection result, the package will be rejected if the stack has an unexpected count. However, current vision systems utilize edge detection to count the number of objects that are present within an image generated by the vision system. Hygienic articles, such as feminine hygiene products, are inherently pliable such that their edges are difficult to detect by edge detection methodologies. Further, some hygienic articles contain a separate release paper, such as a release paper on pantiliners, for example, that may become slightly separated and erroneously counted as an individual hygienic article within the stack.

SUMMARY OF THE PRESENT INVENTION

In one embodiment, a method of counting pliable objects includes capturing an inspection image of a plurality of pliable objects using a camera as the plurality of pliable objects passes into a field of view of the camera. The inspection image is a top view of the plurality of pliable objects. A non-uniform gap is present between adjacent pliable objects of the plurality of pliable objects, and each non-uniform gap is substantially represented by a first luminance value range and each pliable object is substantially represented by a second luminance value range in the inspection image. The method further includes partitioning, by a processor, the inspection image into a plurality of windows traversing the inspection image, and preparing the inspection image for image analysis by setting a background luminance value of the inspection image to within the second luminance value range that substantially represents the pliable objects. For each individual window of the plurality of windows, the method further includes performing a blob extraction process to determine a plurality of blobs corresponding to regions within the inspection image having substantially the second luminance value range such that the plurality of blobs correspond to the plurality of pliable objects. The number of blobs is counted within each window of the plurality of windows, and a signal rejecting or accepting the plurality of pliable objects based at least in part on the number of blobs that are counted in one or more windows is provided.

In another embodiment, a method of processing pliable objects includes populating a package with a plurality of pliable objects according to a desired number of pliable objects, passing the package under a camera such that the plurality of pliable objects are within a field of view of the camera, illuminating the package, and capturing an inspection image of the plurality of pliable objects using the camera. The inspection image is a top view of the plurality of pliable objects. A non-uniform gap is present between adjacent pliable objects of the plurality of pliable objects, and each non-uniform gap is substantially represented by a first luminance value range and each pliable object is substantially represented by a second luminance value range in the inspection image. The method further includes partitioning, by a processor, the inspection image into a plurality of windows traversing the inspection image, and preparing the inspection image for image analysis by setting a background luminance value of the inspection image to within the second luminance value range that substantially represents the pliable objects. For each individual window of the plurality of windows, the method further includes performing a blob extraction process to determine a plurality of blobs corresponding to regions within the inspection image having substantially the second luminance value range such that the plurality of blobs correspond to the plurality of pliable objects. A number of blobs within each window of the plurality of windows are counted, and a number of windows of the plurality of windows having a number of blobs that is equal to a target count is determined. The method further includes accepting the plurality of pliable objects when the number of windows is equal to or greater than a threshold value.

In another embodiment, a system for counting pliable objects includes a camera, a light source for illuminating the plurality of pliable objects when the plurality of pliable objects are positioned within a field of view of the camera, and a controller having a processor and a non-transitory memory device communicatively coupled to the processor. The non-transitory memory device stores machine-executable instructions that, when executed by the processor, causes the controller to provide an image capture signal to the camera that causes the camera to capture an inspection image of a top view of the plurality of pliable objects, wherein a non-uniform gap is present between adjacent pliable objects of the plurality of pliable objects, and each non-uniform gap is substantially represented by a first luminance value range and each pliable object is substantially represented by a second luminance value range in the inspection image. The machine-executable instructions further cause the controller to partition the inspection image into a plurality of windows traversing the inspection image, and set a background luminance value of the inspection image to within the second luminance value range that substantially represents the pliable objects. For each individual window of the plurality of windows, the machine-executable instructions cause the controller to perform a blob extraction process to determine a plurality of blobs corresponding to regions within the inspection image having substantially the second luminance value range such that the plurality of blobs correspond to the plurality of pliable objects. The machine-executable instructions further cause the controller to count a number of blobs within each widow of the plurality of windows, and provide a signal rejecting or accepting the plurality of pliable objects based at least in part on the number of blobs that are counted in one or more windows.

BRIEF DESCRIPTION OF THE DRAWINGS

The following detailed description of the present disclosure can be best understood when read in conjunction with the following drawings, where like structure is indicated with like reference numerals and in which.

Figure 1:
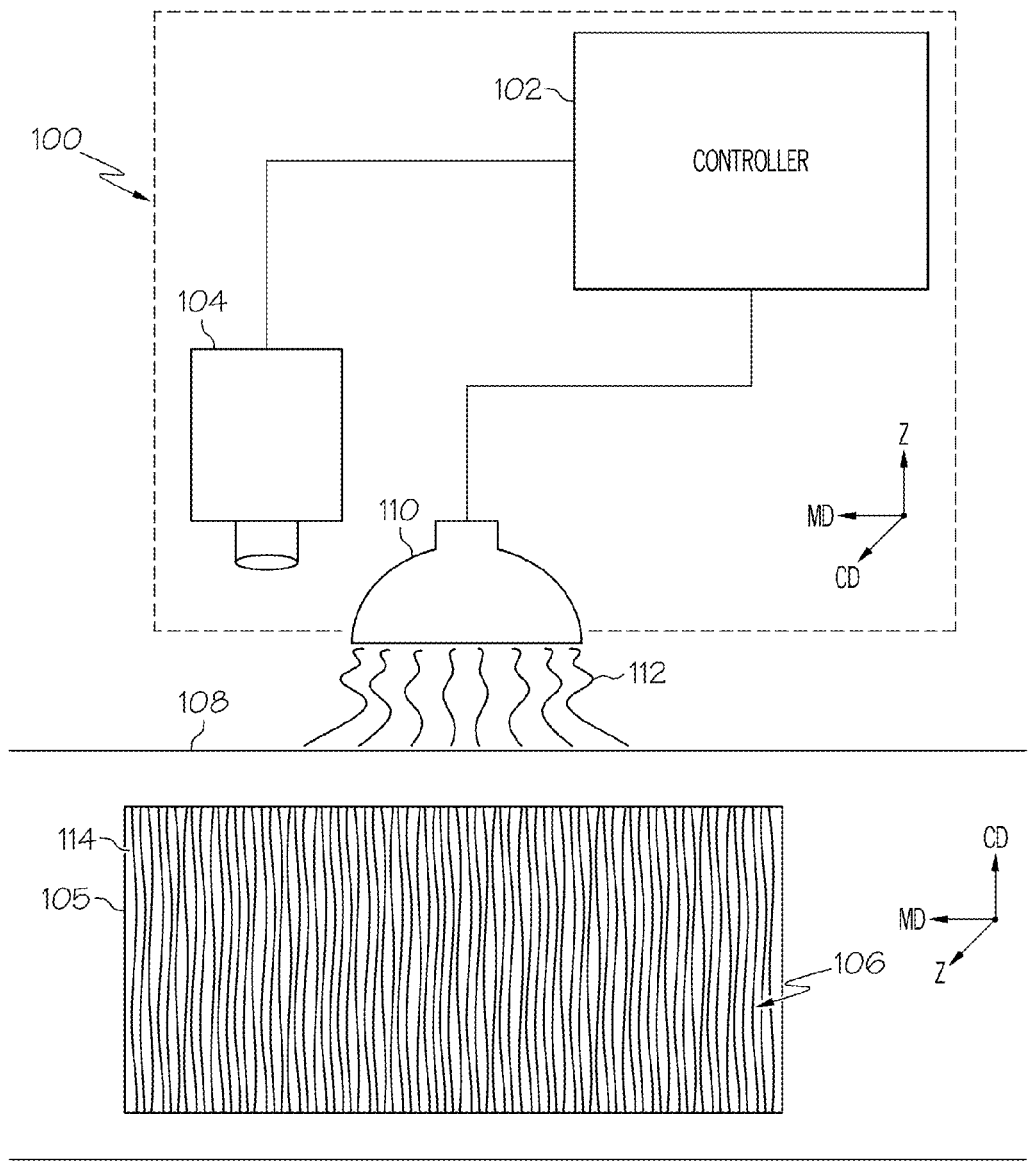
FIG. 1 is a schematic illustration of a vision system for counting pliable objects according to one or more embodiments described and illustrated herein.

Individual aspects of the drawings will be more fully apparent and understood in view of the detailed description that follows.

DETAILED DESCRIPTION

It is desirable to accurately and efficiently verify the number of pliable objects, such as hygienic articles, within a stack prior to sealing such pliable objects in packages for quality control purposes. It has been discovered that utilizing a vision system incorporating blob extraction tools to determine the location and number of pliable objects within a plurality of pliable objects that are to be populated into a package eliminates the use of checkweighers and increases reliability over conventional counting methodologies.

Definitions

As used herein, the following terms are defined as follows:

"Pliable object" refers to hygiene products, such as feminine hygiene products (e.g., pantiliners or pads), disposable diapers, pull-ons, training pants, and adult incontinence articles, as well as disposable absorbent articles, such as paper towels and napkins.

"Disposable" refers to products which are not intended to be laundered or otherwise restored or extensively reused in their original function, i.e., preferably they are intended to be discarded after several uses or after a single use.

"Machine direction" (MD) refers to the direction of movement of a package along a manufacturing line.

"Package" refers to any package that may be used to maintain a plurality of pliable objects (i.e., a pliable object stack). Non-limiting examples of packages include a bag and a cardboard carton.

"Color" refers to the spectral properties of light that can be perceived and distinguished by the naked eye or by an optical sensor. Non-limiting examples of color include infrared, red, orange, yellow, green, blue, indigo, violet, ultraviolet, as well as any declination or mixture thereof. For purposes of this application, black, white, and gray are explicitly excluded from this definition. For example, although white light may include wavelengths that may be categorized as red, it is perceived as being white and is, therefore, neither red nor colored light for purposes of this application.

"Luminance value" refers to an intensity of a portion of an inspection image, such as a pixel. The luminance value indicates how bright a portion of the inspection image will appear to the naked eye or an optical sensor.

"Grayscale" refers to the representation of an image using only black, white, and/or shades of gray/luminance. Pixels of a grayscale image may have a luminance value that are within a range from a minimum representing black (e.g., 0 in a 16 bit system) to a maximum representing white (e.g., 65,535 is a 16 bit system).

"Blob extraction process" refers to a computer image analysis method capable of extracting blobs (i.e., non-linear regions of interest) having a luminance value within a luminance value range that is different from a background luminance value of an inspection image. One exemplary example of a blob extraction process includes a connected-component analysis as is known in the art (e.g., a 4-way connectivity analysis or an 8-way connectivity analysis), wherein connected regions are detected in the inspection image. During a blob extraction process, pixels within the inspection image are divided into two categories, blob or background, based upon a luminance threshold value that separates all of the pixels below the luminance threshold into a black category (e.g., blob), and all of the pixels above the luminance threshold into a white category (e.g., background). Depending on the particular application, the blob extraction process may be utilized to extract regions of different color and luminance or shade, or regions of different grayscale luminance only.

"Blob" refers to a non-linear region of interest of an inspection image that is extracted by the blob extraction process and has a luminance value (or range of luminance values) that are above or below a luminance threshold, depending on what luminance value or range of luminance values the background is set to. When the background luminance is set to white, the blob extraction process will extract blobs having a dark luminance value(s).

"Controller" refers to any electronic device or system that provides control commands to another electronic and/or mechanical system. A controller includes one or more processors (e.g., a microprocessor, central processing unit, application-specific integrated circuit, or the like). A controller may also include one or more non-transitory memory devices (e.g., a RAM, ROM, non-volatile memory, flash memory, hard drive, disk drive, or any other electronic device capable of storing machine-executable instructions) that communicate locally or remotely with the one or more processors. The one or more memory devices store machine-executable instructions that, when executed by the one or more processors, cause the one or more processors to provide the control commands. Non-limiting examples of controllers include personal computers, servers, programmable logic controllers (PLCs), tablet computers, handheld computing devices, mobile telephones, distributed computing systems, cameras, and electronic displays.

Vision Systems

In general, a vision system includes one or more cameras that capture images of packages prior to population of a shipping box or container during the manufacturing process. Any known type of electronic camera may be used. For example, a camera may be a charge-coupled device (CCD), a CMOS-pixel based device, a combination of the two, or any other electronic device that converts received photons into data. Additionally, a camera may capture images in grayscale, in color, or both. The image data captured by a camera is provided to one or more controllers for further analysis. A camera may also have one or more controllers integrated as part of the device (e.g., within the same housing as the camera) and/or transmit the image data to one or more controllers external to the camera. The one or more controllers analyze the image data to determine a number of pliable objects that are present within a package. If the number of pliable objects within the package is determined to not be equal to a target count, the one or more controllers may generate control signals that cause the package to be rejected. In some cases, the one or more controllers may also adjust an upstream device that populates the package with the pliable objects and/or alerts a human operator that maintenance may be necessary. While the systems and methods described herein relate to pliable objects, it should be understood that the systems and methods described herein may also be utilized to detect and count rigid objects that may provide for non-uniform gaps when arranged in a stack.

Referring now to FIG. 1, an illustrative schematic of vision system 100 is shown. Vision system 100 includes camera 104. As shown, camera 104 may be positioned in a fixed location and capture an electronic image of package 105 containing a plurality of pliable objects (i.e., a pliable object stack 106), as it passes vision system 100 in the machine direction along manufacturing line 108. Camera 104 may be oriented above package 105 to obtain a clear top view of pliable object stack 106 contained therein. In some cases, camera 104 may be able to take continuous images (e.g., video). In other cases, camera 104 may only be able to capture still-frame images. In still other cases, camera 104 may be able to capture continuous and still-frame images. If video is used, still-frame images may be discerned by analyzing the video at discrete times. If camera 104 captures still-frame images outright, it may do so periodically or in response to receiving a trigger command from an upstream and/or downstream trigger device that senses when packages pass the trigger device.

Figure 5:
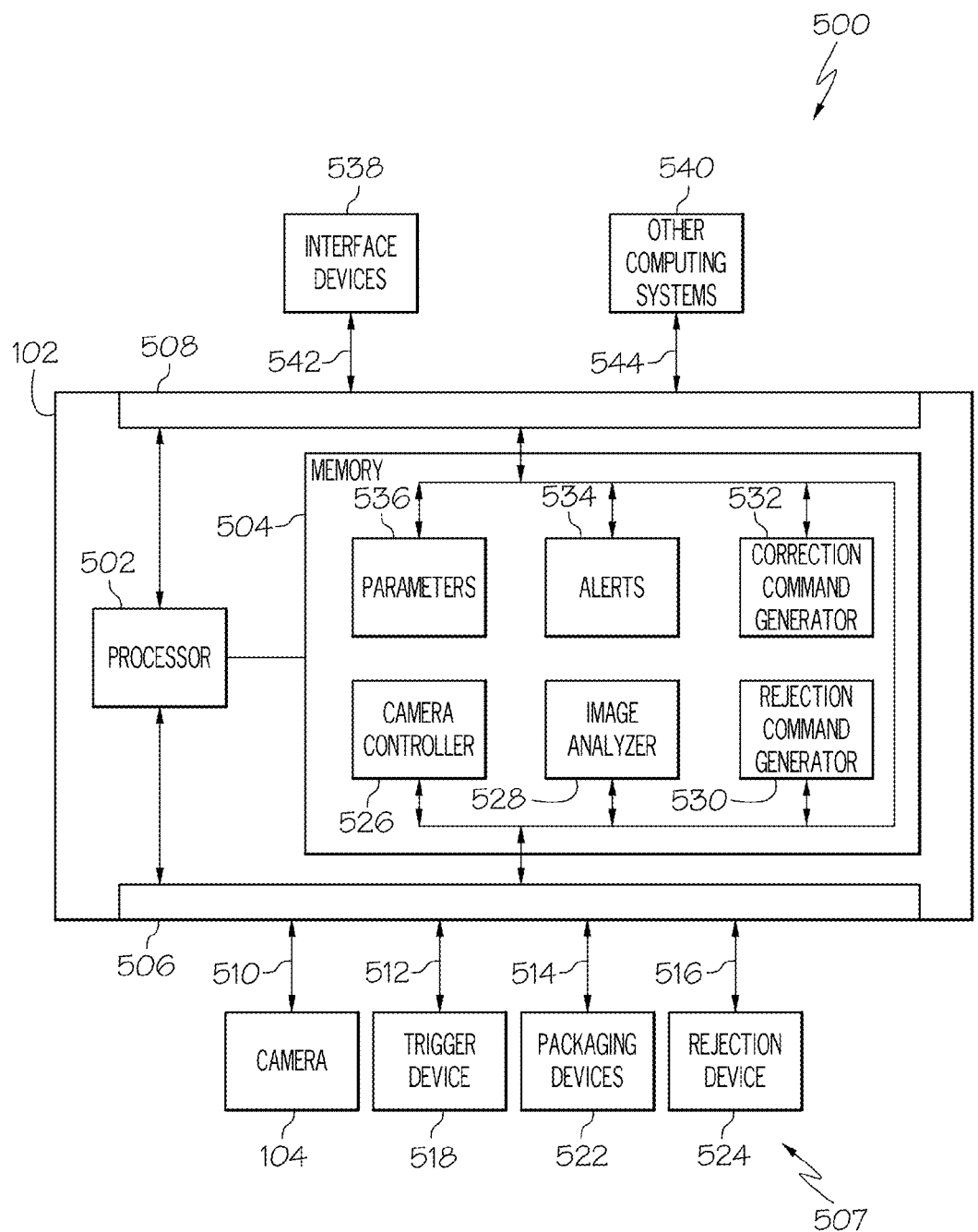
FIG. 5 is a schematic illustration of the controller depicted in FIG. 1 according to one or more embodiments described and illustrated herein.

As shown in FIG. 5, several upstream and/or downstream devices 507 may also be provided as components of an overall manufacturing system 500. The upstream and/or downstream devices 507 may include several components, such as, but not limited to, camera 104, trigger device 518, packaging devices 522, rejection device 524, and trigger device 518.

Referring once again to FIG. 1, camera 104 provides a captured electronic image to controller 102, which analyzes the image to ensure that a number of pliable objects 114 within package 105 is equal to a target count, as described in detail below. If the number of pliable objects 114 within package 105 does not equal the target count, controller 102 may generate a rejection command that causes a downstream device 507 to remove the rejected package 105 from manufacturing line 108 (e.g., a rejection device 524 as shown in FIG. 5). Controller 102 may additionally or alternatively generate an alert to an interface device (e.g., a display, a speaker, or the like) that alerts a human operator about the rejection. In this way, vision system 100 is able to cull defective packages from being shipped to retailers and customers.

In some cases, controller 102 may also maintain a history of rejections and use the history of rejections to initiate corrective measures in the upstream device 507 that populated package 105 with pliable objects 114. For example, if controller 102 determines that the number of pliable objects 114 within package 105 is consistently incorrect, controller 102 may generate a command to one or more upstream devices 507 to adjust how package 105 is populated with pliable objects 114.

If camera 104 captures images in grayscale, vision system 100 may also include lighting 110. Lighting 110 includes one or more light sources (e.g., an incandescent bulb, halogen lamp, light emitting diode, or any other device that emits photons). In some cases, some or all of the light sources of lighting 110 may be controlled by controller 102 (e.g., turned on when package 105 passes vision system 100). In other cases, some or all of the light sources of lighting 110 may be on continuously. While the lighting 110 should be configured to illuminate the populated package 105 uniformly for best results, non-uniform lighting positions may also be used.

If grayscale images are used in vision system 100, the one or more light sources of lighting 110 may emit colored light 112 at one or more wavelengths that increase the contrast of pliable objects 114 against a background in a grayscale image captured by camera 104. For example, if pliable object 114 is of a blue color, illuminating it with red light would maximize the contrast of pliable object 114 against the background in the captured grayscale image. As used herein, contrast is the difference in intensity between the pixels representing the pliable objects 114 and the pixels representing the gap between pliable objects 114. Wavelengths of illumination other than those within the visible spectrum may also be used to increase the contrast between the pliable objects 114 and the gap therebetween, such as illumination having wavelengths within the ultra-violet spectrum.

Figure 2:
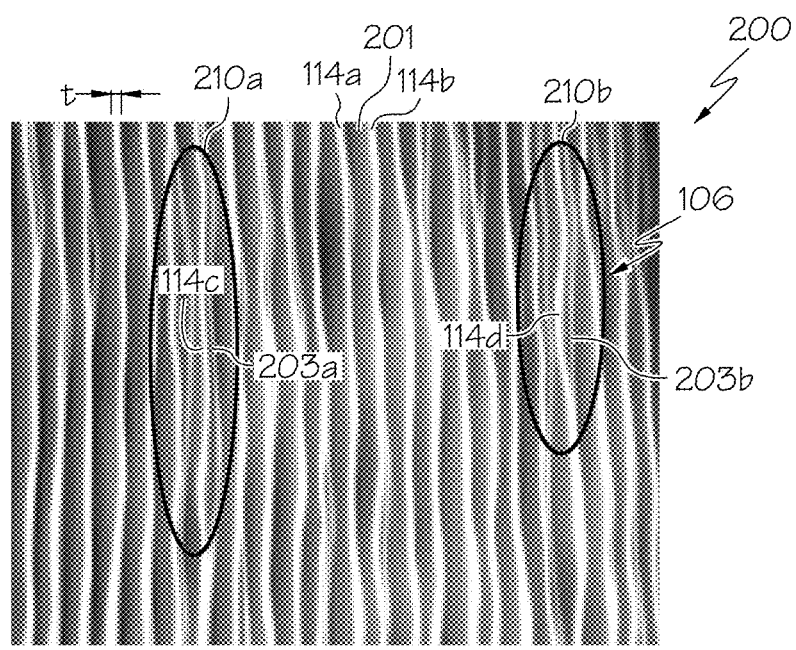
FIG. 2 is a portion of an exemplary inspection image of a plurality of pliable objects.

Referring now to FIG. 2, a portion of an exemplary inspection image 200 acquired by camera 104 of vision system 100 is depicted. Inspection image 200 depicts a plurality of pliable objects arranged in pliable object stack 106. Because the pliable objects (e.g., pliable objects 114a-114d) are pliable, they have a non-linear edge when populated in the package. The non-linear edges of the pliable objects may lead to a non-uniform gap between adjacent pliable objects. For example, a non-uniform gap 201 is present between adjacent pliable objects 114a and 114b. Such a non-uniform gap 201 and non-linear edges of the pliable objects 114a, 114b may lead to counting errors in a vision system relying on conventional edge detection methods. Additionally, the thickness t of relatively thin pliable objects (e.g., thickness of less than 3 mm) may also lead to counting errors. The pliable objects 114a-114d have luminance values that are closer to white, and the non-uniform gaps 201 have luminance values that are closer to black. The non-uniform gaps 201 may be represented by shades of gray that vary from bright to dark.

Figure 8A:
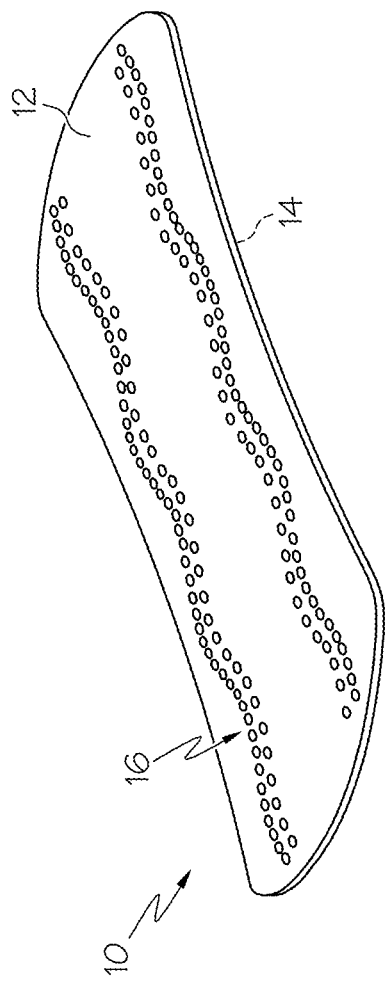
FIG. 8A is a top perspective view of an exemplary pantiliner.
Figure 8B:
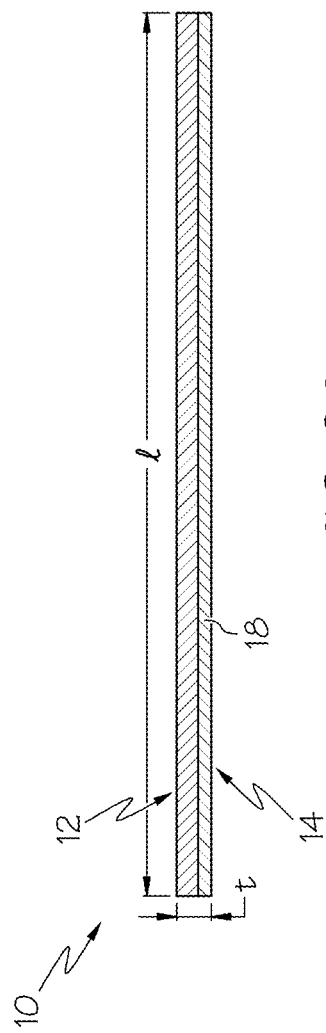
FIG. 8B is a side view of the pantiliner shown in FIG. 8A.
Figure 9B:
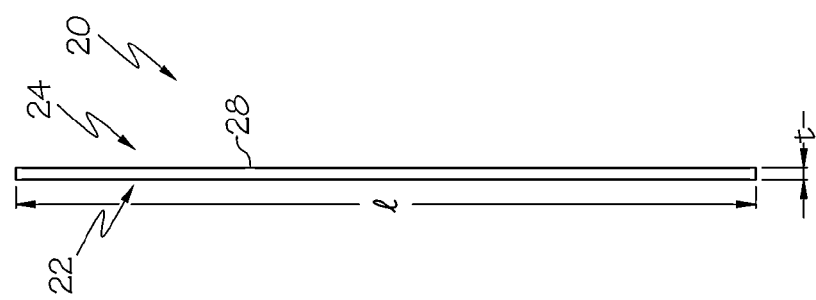
FIG. 9B is a side view of the pad shown in FIG. 9A.
Figure 9A:
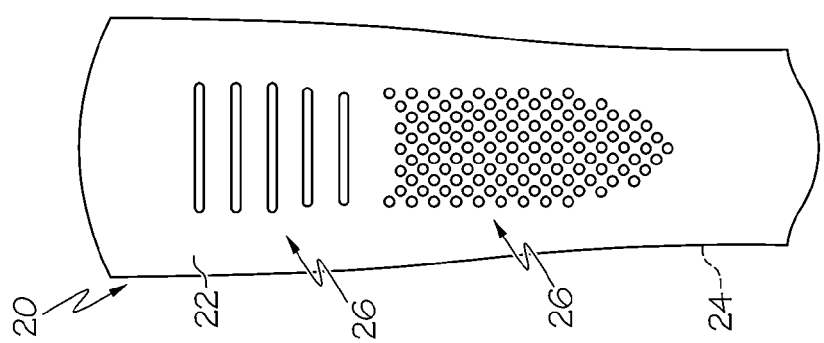
FIG. 9A is a top view of an exemplary pad.

Additionally, pliable object stack 106 depicted in FIG. 2 comprises a plurality of feminine hygiene products, which may include pads, pantiliners, or the like. An exemplary pantiliner 10 is shown in FIGS. 8A and 8B, and an exemplary pad 20 is shown in FIGS. 9A and 9B. The pantiliner 10 comprises a body-facing side 12 and a garment-facing side 14. The pantiliner 10 comprises a length 1 and a thickness t. The body-facing surface 12 may comprise decoration 16 such as colors, patterns, embossing, aperturing, printing, etc. The pantiliner 10 also comprises a release paper 18 adhered to the garment-facing side 14. Similarly, the pad 20 comprises a body-facing side 22 and a garment-facing side 24. The pad 20 comprises a length 1 and a thickness t. The body-facing surface 22 may comprise decoration 26 such as colors, patterns, embossing, aperturing, printing, etc. The pad 20 also comprises a release paper 28 adhered to the garment-facing side 24. In some cases, the release paper may partially separate from the feminine hygiene product. Turning back to FIG. 2, non-linear regions 210a and 210b highlight a release paper separating from the feminine hygiene product. In region 210a, release paper 203a has partially separated from feminine hygiene product 114c. Similarly, in region 210b, release paper 203b has partially separated from feminine hygiene product 114d. Separation of the release paper from the pliable object (such as feminine hygiene products 114c, 114d) may lead to an erroneous count of the pliable objects within the pliable object stack using conventional vision systems because the vision system may count the release paper as an individual pliable object and thus count a single pliable object as two pliable objects.

Embodiments of the present disclosure utilize one or more blob extraction processes to extract non-linear regions corresponding to individual pliable objects within the pliable object stack. These non-linear regions may be counted to obtain a final count for the number of pliable objects within the pliable object stack. Conventionally, blob extraction processes have been used to detect non-linear defects or abnormalities within a background of an inspection image defined by the object under analysis. As an example and not a limitation, the "BLOB TOOL" developed by Cognex of Natick, Mass. and commercially available in Cognex's In-Sight Explorer vision system software application utilizes a blob extraction process to detect defects or abnormalities within a part. Blob extraction processes may include connected-component labeling as known in the art, where an inspection image is subdivided into a graph comprising pixels. Each pixel is labeled with respect to similarity to neighboring pixels to extract non-linear regions of interest.

Conventionally, the background of the inspection image is set to be the luminance of the object that is under analysis within the inspection image when the inspection image is a grayscale image such that the blob extraction process is configured to detect defects or particular regions within the object having a luminance value that is different from the luminance value of the object within the inspection image. However, in the embodiments of the present disclosure, the background of the inspection image is set to be a luminance value that is represented by the gap (e.g., gap 201 in FIG. 2) between adjacent pliable objects (e.g., pliable objects 114a, 114b) within the inspection image. In the case where the pliable objects are represented by a white luminance value range and the gap 201 between adjacent pliable objects are represented by a dark luminance value range due to shadows between adjacent pliable objects, the background luminance value may be set to white. In this manner, the blob extraction process may extract "blobs" (i.e., regions of interest) from the image that represent the actual object rather than a defect or some other feature of the part. In other words, a blob extraction process is used to detect and count the number of pliable objects within the pliable object stack rather than an edge detection methodology.

Although the inspection images of the present disclosure are described in the context of grayscale inspection images, embodiments are not limited thereto. For example, a blob extraction process may be utilized to extract blobs or regions of interest from a color inspection image, wherein the blobs are regions of interest having a wavelength within a particular color range.

In some aspects of the present disclosure, the inspection image generated by camera 104 may be preprocessed prior to applying the blob extraction process. As an example and not a limitation, an image processing technique such as a top-hat filter may be applied to the inspection image by processor 502 (see FIG. 5) to increase the contrast between the pliable objects within the pliable object stack and the shadows of the gap between adjacent pliable objects. More specifically, the top-hat filter may filter out everything except for bright features that are smaller than the size of the processing neighborhood. The result is an output image that displays these bright features as bright pixels on an otherwise dark background. The processing neighborhood is a region of pixels within the inspection image where the top-hat filter (or other image processing technique) is applied. As an example and not a limitation, a processing neighborhood may be defined by a region that is 15 pixels wide and 3 pixels high where a top-hat filter determines, based on the luminance values of the pixels within that region, how to manipulate the pixels (e.g., by shifting their grayscale luminance value) to increase the contrast of the pixels within that region, thereby increasing the contrast of the overall image.

Figure 3A:
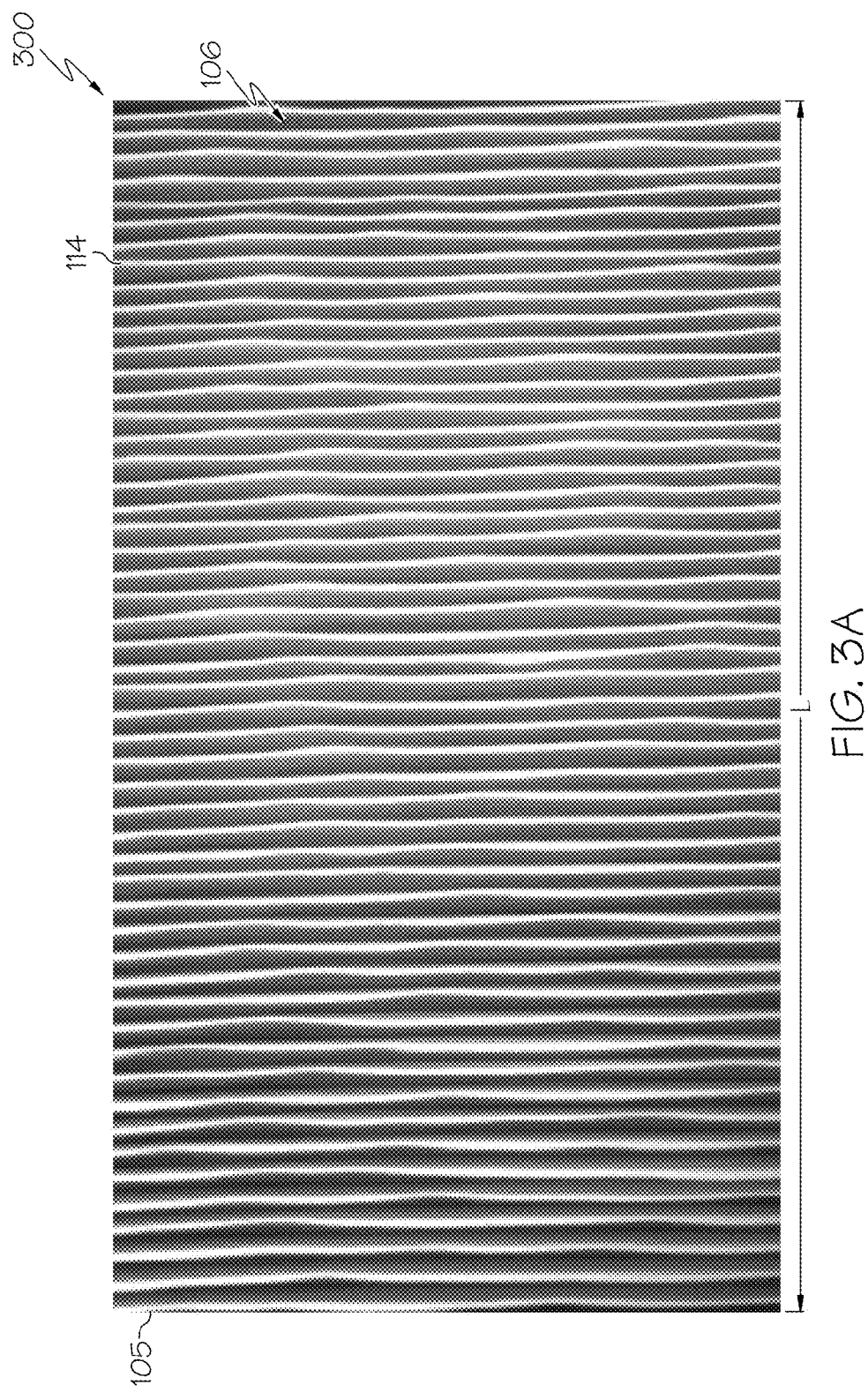
FIG. 3A is an exemplary inspection image of a plurality of pliable objects.
Figure 10:
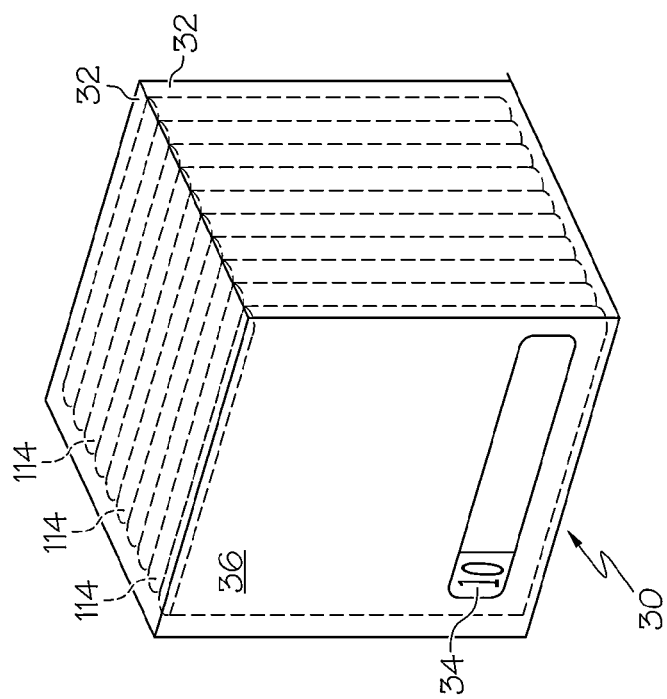
FIG. 10 is a front perspective view of an exemplary package.

FIG. 3A depicts an exemplary inspection image 300 of package 105 containing individual pliable objects 114 configured as feminine hygiene products arranged in pliable object stack 106. It is noted that only one pliable object 114 is numbered in FIG. 3A for simplicity. Each bright region within the exemplary inspection image 300 represents a pliable object 114. As described above, individual pliable objects 114 have non-linear edges making counting of individual pliable objects 114 by edge detection a difficult endeavor. An exemplary package 105 is shown in FIG. 10 which comprises a plurality of pliable objects 114 configured as feminine hygiene products. The feminine hygiene products may be in an unwrapped and unfolded state (e.g., FIGS. 8A-9B), or, the feminine hygiene products may be in a folded and wrapped state (e.g., FIG. 10). The feminine hygiene products are stacked adjacent to one another in a carton 30. The front face 36 of the carton 30 shows the number, or count 34, of feminine hygiene products contained within the carton 30 (e.g., ten pads).

Figure 3B:
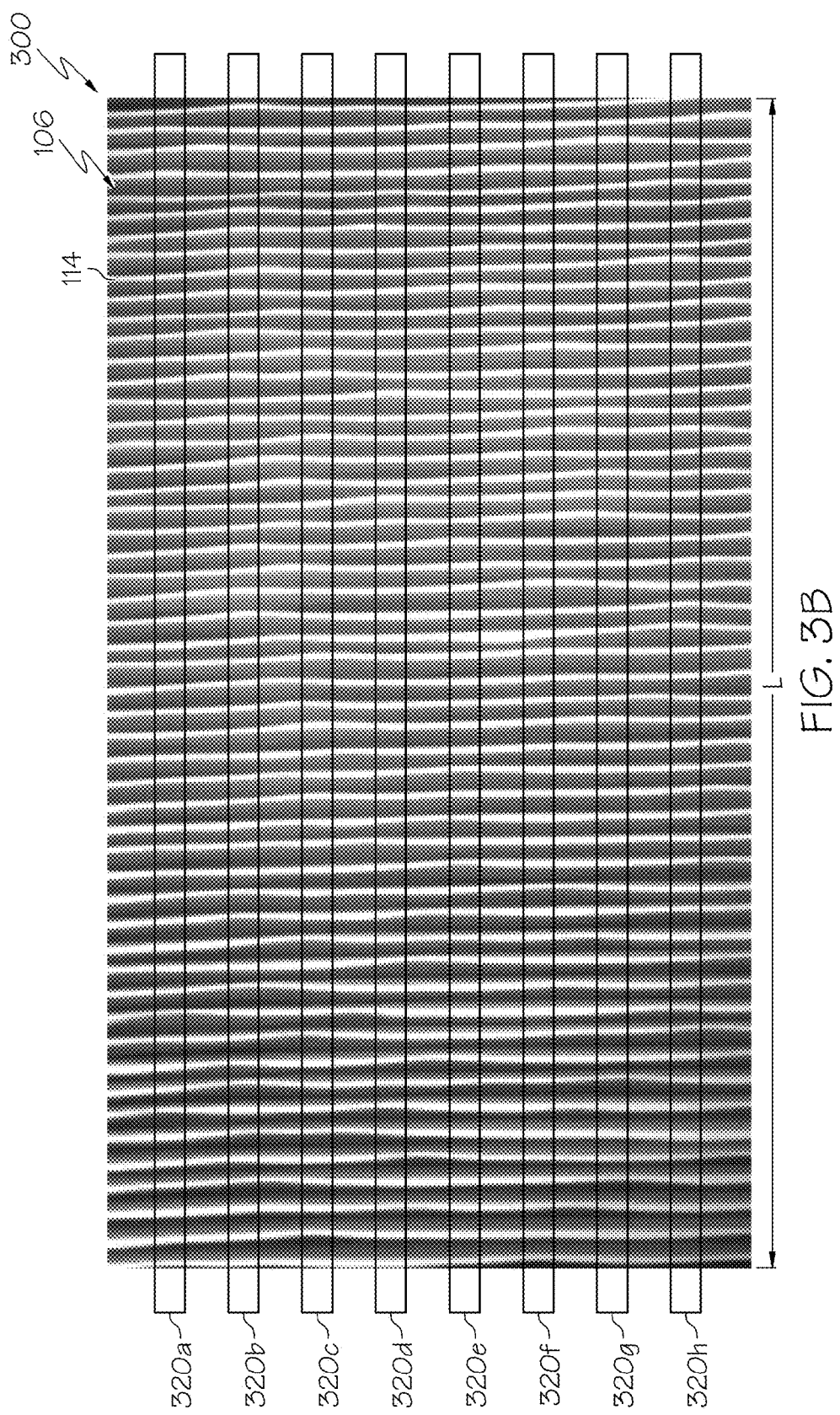
FIG. 3B is the exemplary inspection image of the plurality of pliable objects depicted in FIG. 3A having a plurality of windows applied thereto according to one or more embodiments described and illustrated herein.

A method of counting individual pliable objects 114 in the pliable object stack 106 according to the present disclosure may include creating or otherwise defining a plurality of windows that traverse the length L of inspection image 300, wherein a number of individual pliable objects are detected and counted within each window. FIG. 3B depicts eight vertically arranged windows 320a-320h traversing inspective image 300 horizontally along the length L. More or fewer windows 320a-320h may be utilized depending on the particular application. The blob extraction process may be applied to only those regions within windows 320a-320h to reduce processing resources of the one or more processors of the controller 102. Alternatively, the blob extraction processes may be applied to the entire inspection image 300, effectively using only one window which encompasses the entire inspection image. Use of windows 320a-320h may increase the accuracy of the counting of individual pliable objects 114 because in some regions of the image, adjacent pliable objects 114 may contact one another in a particular portion of inspection image 300 such that no discernible gap exists between the adjacent pliable objects 114 in the particular portion. However, the two adjacent pliable objects 114 may not contact each other in other portions of the inspection image 300.

As described above, the blob extract process extracts blobs (i.e., regions of interest) corresponding to pliable objects 114 within the pliable object stack 106. The extracted blobs have a luminance value range within the second luminance value range associated with the pliable objects. The blobs may be outlined by lines or other formatting such that the extracted blobs are visible to the operator of the system.

Figure 3C:
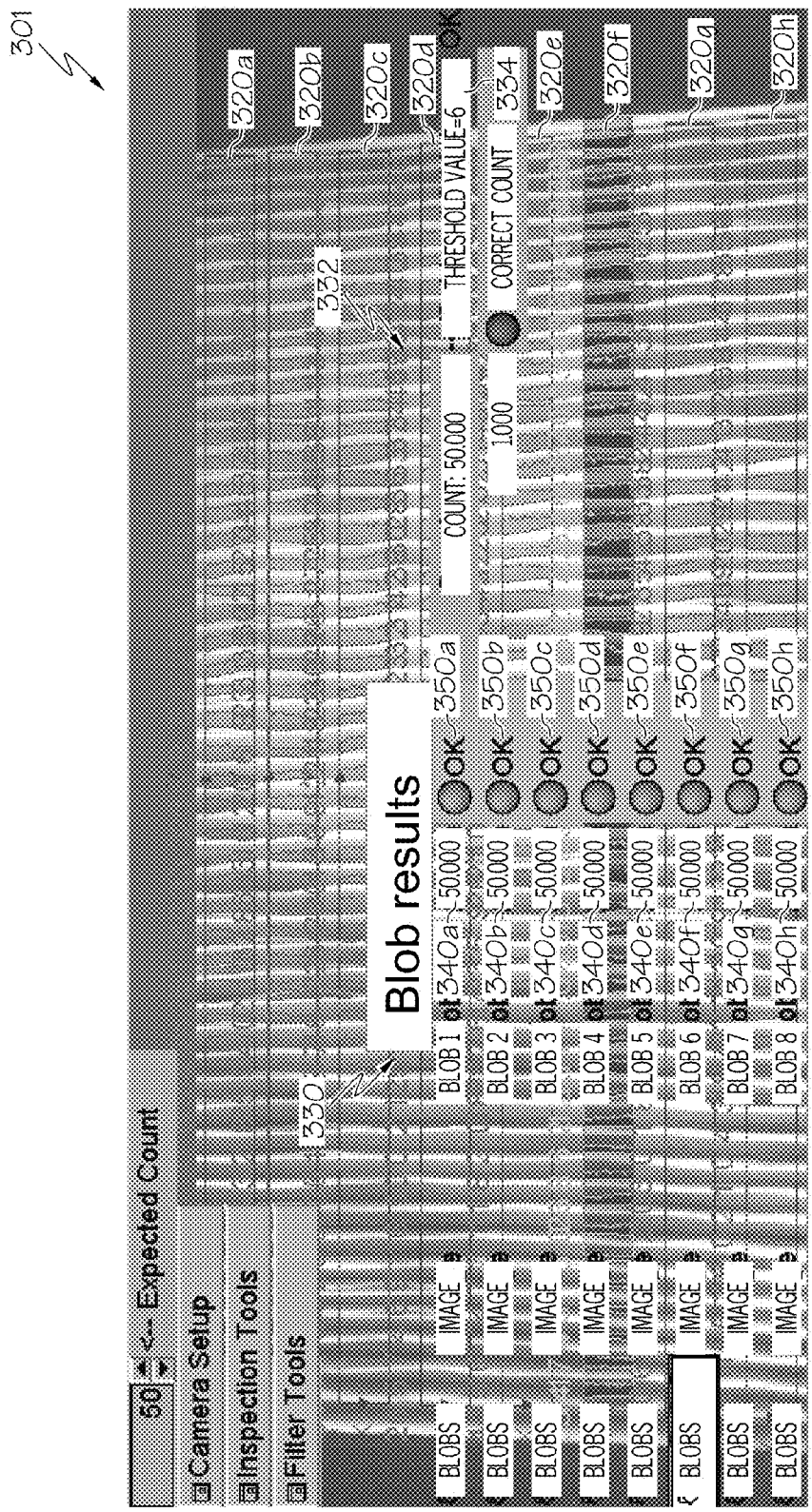
FIG. 3C is an exemplary user interface of a program to count a plurality of pliable objects according to one or more embodiments described and illustrated herein.

For each window 320a-320h, the controller 102 may count the number of individual blobs and therefore count the number of pliable objects. The counts of individual blobs determined for each window 320a-320h may be used to either reject or accept package 105 associated with inspection image 300. FIG. 3C depicts an exemplary user interface 301 that may be utilized to accept or reject packages using a blob extraction process counting technique. As an example and not a limitation, the count for each window 320a-320h may be compared to a target count 332. In this illustrated example, the target count 332 is fifty, which corresponds to a total number of feminine hygiene products that may be printed on package 105. It is noted that window 320f is highlighted to better illustrate the detection of blobs.

In the illustrated example, each window 320a-320h has fifty blobs that were counted as shown in results region 330, resulting 100% accuracy. However, there may be cases where one or more windows have a count that is different from the target count 332 for a variety of reasons, such as adjacent pliable objects contacting one another, faulty parameters, and the like. As an example and not a limitation, controller 102 may determine how many of the windows 320a-320h have a count 340a-340h that is equal to the target count 332, and accept the package when the number of windows 320a-320h having a count 340a-340h equal to the target count 332 is equal to or greater than a threshold value 334. As an example and not a limitation, the threshold value 344 may be seven windows such that if only six windows have a count that is equal to the target count 332, controller 102 may reject the particular package. Further, if one or more windows 320a-320h has a count 340a-340h that is outside of a predetermined threshold range, controller 102 may reject the particular package 105. As an example and not a limitation, the predetermined threshold range 350a-350h may be fifty pliable objects plus or minus five pliable objects. If one or more windows 320a-320h has a count 350a-350h of fifty-six, controller 102 may reject the particular package 105.

Figure 4A:
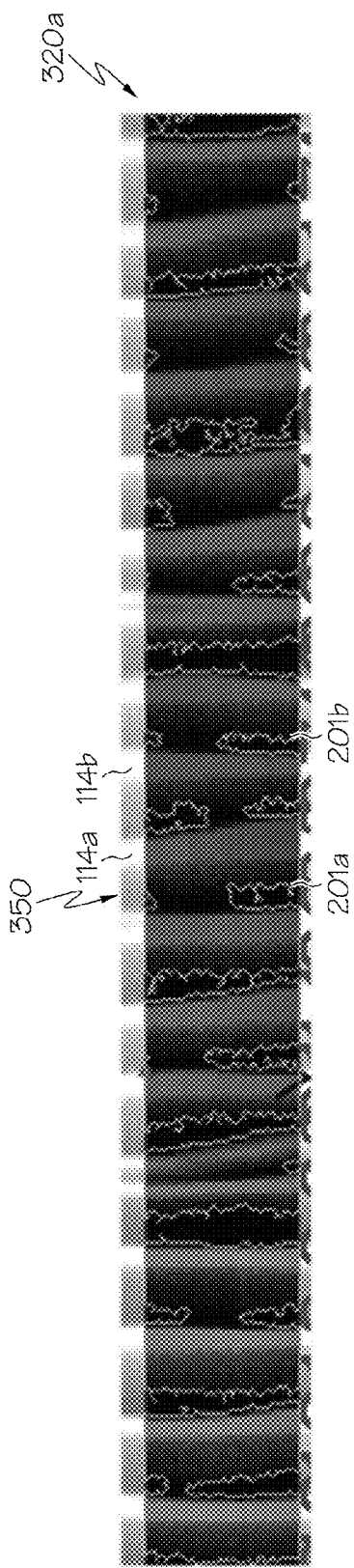
FIGS. 4A and 4B are close-up views of a window applied to an inspection image according to different parameter sets to extract blobs from the inspection image.
Figure 4B:
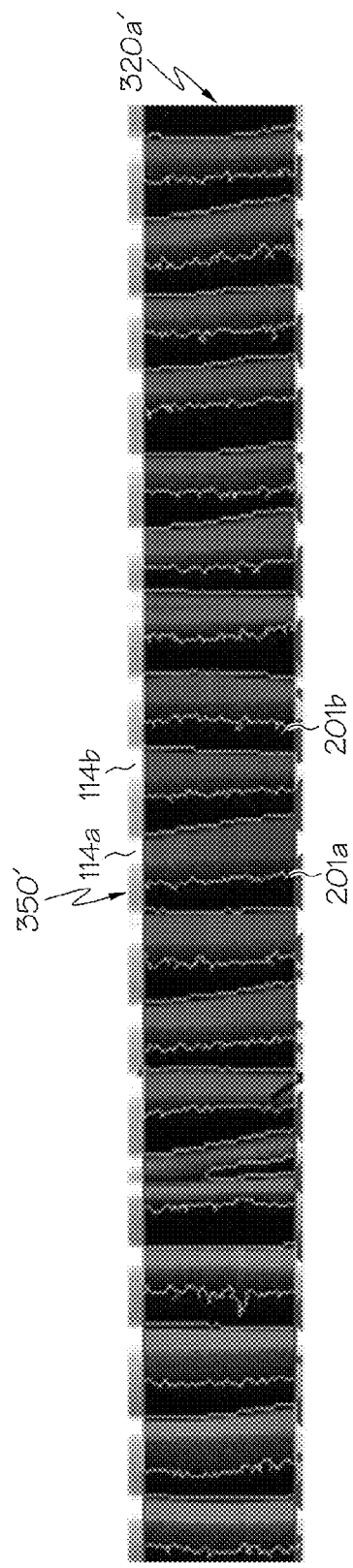

Referring now to FIGS. 4A and 4B, a portion of a window is depicted in greater detail according to two different image processing settings (window 320a in FIG. 4A and window 320b in FIG. 4B). Referring initially to FIG. 4A, a plurality of pliable objects (e.g., pliable objects 114a and 114b) are separated by a plurality of gaps (e.g., gaps 201a, 201b) that are defined by shadows between adjacent pliable objects. The blob extraction process has determined a plurality of blobs that represent the plurality of pliable objects. Light-colored lines outline the plurality of blobs (e.g., blob 350). It is noted that only blob 350, blob 350', gap 201a, gap 201b, pliable object 114a and pliable object 114b are numbered in FIGS. 4A and 4B for simplicity.

The plurality of gaps have a variable luminance that progresses from light gray to black, which may be dependent upon the lighting and image pre-processing. Pre-processing parameters that may be set may include a grayscale threshold value that may be used to separate the blobs from the background. The smaller the grayscale threshold value, the bigger the blob area will be. However, if the blob area is too large, then blobs may touch their neighbors and, instead of counting multiple pliable objects, may only count one pliable object. Additional parameters may also include minimum and maximum blob area restrictions, as well as image gain. As an example and not a limitation, the parameters defining the minimum and maximum blob area restrictions may be set to desired numbers of pixels. The minimum and maximum blob area restrictions may be set to prevent erroneously counting the release paper of a pliable object as a separate pliable object.

FIG. 4A depicts the extraction of blobs using a blob extraction process having a first set of parameters. FIG. 4B depicts the extraction of blobs using a blob extraction process having a second set of parameters. More specifically, the grayscale threshold value used in the blob extraction process resulting in the plurality of blobs of FIG. 4A (e.g., blob 350) is less than the grayscale threshold value used in the blob extraction process resulting in the plurality of blobs of FIG. 4B (e.g., blob 350'). FIG. 4A illustrates that blob 350 is a large blob that spans across several gaps (e.g., gap 201a and 201b) and several pliable objects (e.g., pliable object 114a and pliable object 114b), which may be the result of too low of a grayscale threshold. Blob 350' does not span across pliable objects 114a, 114b and clearly delineates pliable object 114b, which will result in counting pliable objects 114a, 114b as two pliable objects rather than as one.

Referring now to FIG. 5, a schematic illustration of the manufacturing system 500 and controller 102 is shown. Controller 102 includes a processor 502, which may be one or more processors communicatively coupled to a memory 504, interface 506, and interface 508. Memory 504 may be any form of memory capable of storing machine-executable instructions that implement one or more of the functions disclosed herein, when executed by processor 502. For example, memory 504 may be a RAM, ROM, flash memory, hard drive, EEPROM, CD-ROM, DVD, other forms of non-transitory memory devices, or the like. In some cases, memory 504 may be any combination of different memory devices.

While controller 102 is shown as a single device, it is to be understood that this is exemplary only and that controller 102 may include processing components that span multiple physical devices, without deviating from the scope of the present disclosure. For example, processor 502 may include a processor that is part of camera 104 and a processor that is part of a remote server (e.g., other computing systems 540). In another example, memory 504 may include a hard drive of a remote server (e.g., other computing systems 540) and a non-volatile memory of camera 104.

Connections 510, 512, 514, and 516 provide one or more wired or wireless connections between controller 102 and upstream or downstream devices 507, such as camera 104, trigger device 518, packaging devices 522, and rejection device 524, respectively. In some cases, connections 510, 512, 514, and 516 may be combined connections. For example, connection 510 and 516 may be part of a shared data bus or backplane. Connections 510, 512, 514, and 516 may also provide direct connections to controller 102 or indirect connections (e.g., via one or more intermediary connection devices, such as a router, other controller, or the like). For example, connection 516 may be an indirect connection over a local area network (LAN).

Interface 506 provides the one or more wired or wireless connections 510, 512, 514, and 516 for controller 102. For example, interface 506 may provide a wireless connection between controller 102 and packaging devices 522 and provide a hardwired connection to camera 104. Non-limiting examples of the types of interfaces provided by interface 506 include a radio frequency transceiver, a WiFi transceiver, a Cat 5 port, a telephone jack, a serial bus, an I/O module, a USB port, and the like.

Trigger device 518 may be one or more sensors that are upstream and/or downstream from camera 104 and sense the passing of packages. For example, trigger device 518 may be a programmable limit switch, a motion sensor, another vision system, or any other device that discerns the presence and/or timing of packages as they pass. Trigger device 518 may be used by controller 102 to control the timing of when camera 104 captures images of packages. In such a case, trigger device 518 provides a trigger command to controller 102 whenever a package is detected by it.

Packaging devices 522 may be configured as one or more devices upstream from camera 104 that populates packages with a desired number of pliable objects. In non-limiting examples, packaging devices 522 may be include a conveyor belt, actuators, and the like. In some cases, controller 102 may detect package count errors and cause one or more packaging devices 522 to correct the source of the defects (e.g., by changing the speed of the conveyor).

Rejection device 524 is a device downstream from camera 104 that reroutes defective packages having an erroneous count of pliable objects from the manufacturing line. If controller 102 determines that an inspected package is defective, it generates a rejection command that causes rejection device 524 to remove the defective package from being further processed. In this manner, vision system 100 is able to automatically cull defective packages from the manufacturing process.

Connections 542 and 544 also provide one or more wired or wireless connections between controller 102, interface devices 538, and other computing systems 540. Connections 542 and 544 may be individual connections, shared connections, direct connections, and/or indirect connections. For example, connection 544 may be an indirect connection that connects controller 102 to other computing systems 540 via the Internet.

Similar to interface 506, interface 508 provides the one or more wired or wireless connections 542 and 544 for controller 102. In some cases, interfaces 506 and 508 may also be combined. For example, connections 514 and 544 may both utilize a WiFi connection to a LAN. In such a case, interfaces 506 and 508 may be combined and include a single WiFi transceiver that provides connections 514 and 544.

Interface devices 538 are one or more electronic devices that receive and/or convey information between controller 102 and a human user. In non-limiting examples, interface devices 538 may be one or more electronic displays, speakers, printers, portable electronic devices, keyboards, touch-screen displays, pointing devices, and the like. For example, an operator may utilize interface devices 538 to learn about the rejection of packages by vision system 100 or to configure controller 102.

Other computing systems 540 are one or more computing devices (e.g., servers, personal computers, laptops, portable electronic devices, programmable logic controllers, and the like) that provide additional functionality to the manufacturing process. For example, other computing systems 540 may include a server that uses information about package rejections from controller 102 to generate reports about the rejected packages.

Memory 504 includes camera controller 526 which generates image capture commands that cause camera 104 to capture images of packages as they pass camera 104. In some cases, camera controller 526 may receive a trigger command from trigger device 518 and use the trigger command to control the timing of when camera 104 captures an image. In other cases, trigger device 518 is omitted and camera controller 526 utilizes a timing value (e.g., stored in parameters 536) to determine when camera 104 captures images.

Image analyzer 528 receives the captured images from camera 104 and analyzes them utilizing the blob extraction processes described above. Image analyzer 528 may also allow a user to define one or more subsets stored in parameters 536 which are used to pre-process the captured images, perform blob-extraction, count extracted blobs, and/or accept or reject packages.

Image analyzer 528 detects the number of pliable objects within package 105 by a blob extraction process. For example, image analyzer 528 may first extract blobs from the captured inspection image that represent pliable objects within package 105, and then count the blobs to arrive at a total number of pliable objects within package. As described above, the captured inspection image may be divided into sections or windows such that blobs are counted in each window.

If image analyzer 528 determines that the package in the inspection image contains a number of pliable objects that is not equal to a target count and it is to be rejected, the image analyzer 528 may then provide an indication of this to rejection command generator 530. Rejection command generator 530 may generate rejection commands that cause rejection device 524 to remove a rejected package from the manufacturing process. Rejection command generator 530 may receive the indication from image analyzer 528 that the inspected package contains an incorrect number of pliable objects and generates a rejection command for rejection device 524. In some cases, the rejection command may be a direct command (e.g., controller 102 provides direct control over rejection device 524). In other cases, the rejection command may be indirect (e.g., another controller provides direct control over rejection device 524 to reject a package in response to receiving a rejection command). Additionally, the rejection command may cause an electronic signal to be generated or removed, in order to cause a package to be rejected. For example, rejection device 524 may only reject a package if an electronic signal is removed (e.g., is active-low). In such a case, the rejection command causes the signal to be removed, thereby rejecting the package.

Rejection command generator 530 may also maintain a history of rejection commands, in lieu of or in addition to, generating rejection commands. In some cases, controller 102 may provide the history to interface devices 538 and/or to other computing systems 540 for further analysis. In other cases, rejection command generator 530 may also utilize the history to determine if corrective measures should be taken. For example, if the number of rejections exceeds a threshold stored in parameters 536, this may indicate that corrective measures should be taken.

In some cases, rejection command generator 530 may determine that corrective action may be taken automatically and provide an indication of this to correction command generator 532. In response, correction command generator 532 generates a correction command that causes packaging devices 522 to change their operating state (e.g., a speed or force at which packaging devices 522 operate). In this manner, vision system 100 is able to automatically correct some sources of pliable object population errors without human interaction.

In other cases, rejection command generator 530 may determine that corrective action requires human interaction and generate one or more alerts 534. Alerts 534 are provided by controller 102 to interface devices 538 and/or to other computing systems 540 to alert a human operator that maintenance of packaging devices 522 may be necessary. In extreme cases, rejection command generator 530 may also generate a stop command that causes the manufacturing system to stop processing pliable objects until maintenance is performed.

Parameters 536 contain one or more values that affect how controller 102 functions. For example, parameters 536 may include an override value that, when set, disables the generation of rejection command by rejection command generator 530. In another example, parameters 536 may include one or more values that are used to determine when packages are to be rejected due to count errors, when alerts 534 are to be provided to a user via interface devices 538, and when correction commands should be generated. In some cases, parameters 536 may be predefined while, in other cases, parameters 536 may be provided by interface devices 538 and/or other computing systems 540.

Figure 6:
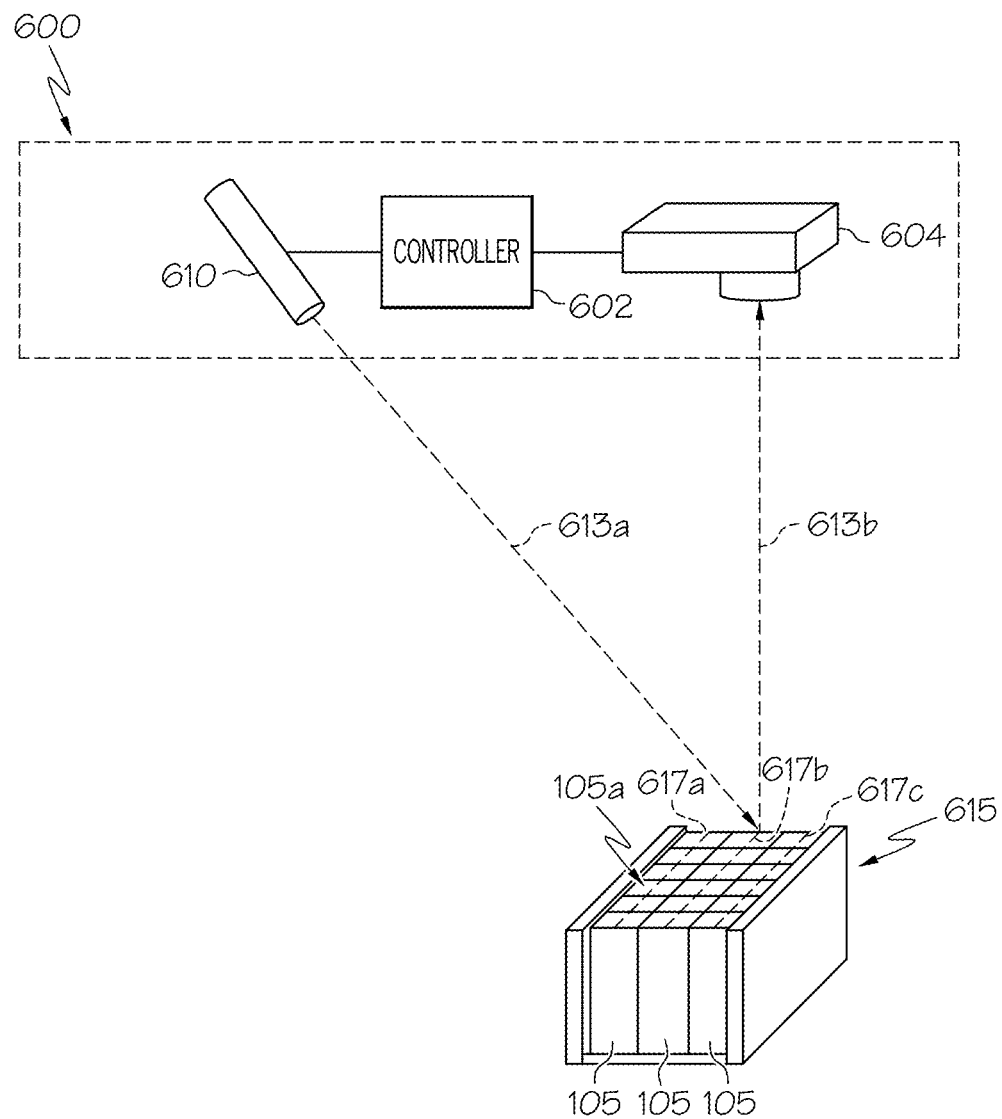
FIG. 6 is a schematic illustration of a vision system for counting packages within a shipping box according to one or more embodiments described and illustrated herein.

Packages 105 having been accepted by vision system 100 may be transported and further populated into a shipping box or container for shipment to retailers or other customers. The number of packages 105 within the shipping box should equal a desired target value so that the proper number of packages 105 is shipped. FIG. 6 schematically depicts an exemplary vision system 600 configured to count packages 105 within shipping box 615. Shipping box 615 is populated with packages 105 arranged in columns C and rows R. Vision system 600 includes light source 610, controller 602, and camera 604. The light source 610 may be configured to generate one or more laser beams 613a to scan one or more lines of light 617a-617c on a top surface 105a of packages 105 within shipping box 615. Camera 104 may be configured as a device capable of detecting laser light 613b reflected off top surface 105a of packages 105 (e.g., a CCD camera, a laser scanner device, and the like). Controller 602 may generate signals to control light source 610 and camera 604, and may include one or more processors and memory devices, as described above with respect to controller 102 described above and illustrated in FIGS. 1 and 5.

Figure 7:
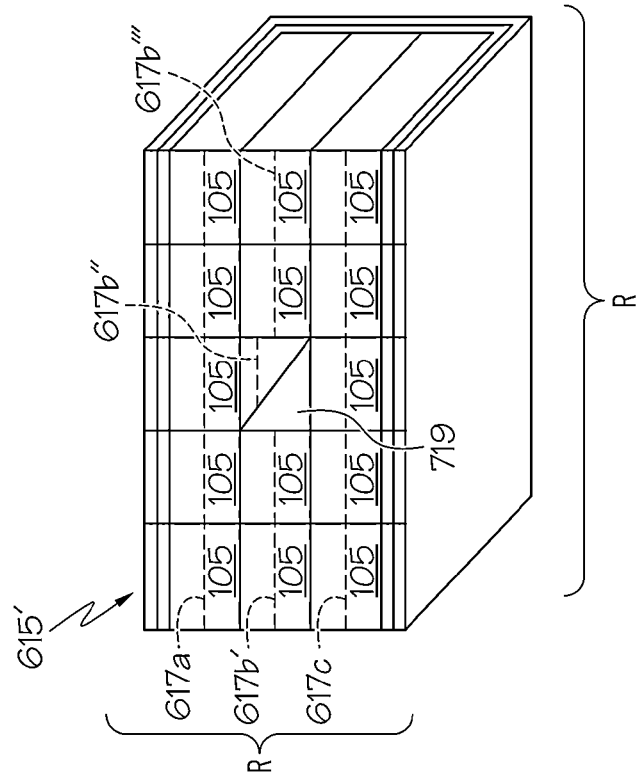
FIG. 7 is a schematic illustration of a full shipping box and a partial shipping box being counted by the vision system depicted in FIG. 6 according to one or more embodiments described and illustrated herein.
Figure 7:
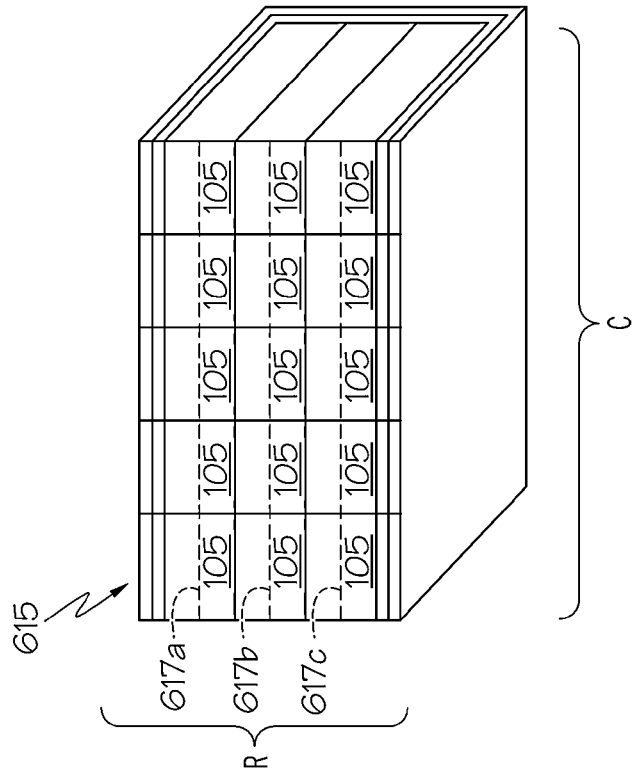

FIG. 7 depicts first shipping box 615 fully populated with packages 105, and second shipping box 615' containing one too few packages 105, leaving blank space 719 within shipping box 615'. Referring to first shipping box 615, light source 610 generates first line of light 617a, second line of light 617b, and third line of light 617c such that each package 105 is illuminated with one of first through third lines of light 617a-617c across the individual rows R of packages. The light source 610 may be any light source capable of generating the lines of light. In one embodiment, the light source 610 is a laser light source. Each row R may be illuminated with a line of light as illustrated in FIG. 7. Alternatively, each column C may be illuminated with a line of light. It should be understood that any number of lines of light may be generated, and embodiments described herein are not limited to three lines of light. For instance, the number of lines of light may be equal to the number of columns C and the number of rows R, or a combination thereof. Each row R and/or column C may be illuminated with more than one line of light, for example. Light source 610 may be configured to generate lines of light 617a-617c simultaneously, such as by the use of a beam splitter, or sequentially one after the other. Because first shipping box 615 is fully populated with packages 105, first through third lines of light 617a-617c are continuous across first shipping box 615.

Referring now to second shipping box 615', blank space 719 causes line of light 617b to be discontinuous, having three line portions 617b', 617b", and 617b'" wherein shifted line portion 617b" is shifted such that it is present on an adjacent package 105. Camera 604 may detect that line of light 617b is discontinuous as it monitors second shipping box 615'. Upon detection of a shifted line portion (or an absent portion of a line of light), controller 602 may issue an alarm to alert personnel that one or more packages are missing from a shipping box. In this manner, vision system 600 may efficiently verify that a correct number of packages 105 are present within shipping box 615 without human interaction.

Many modifications and variations are possible in light of the above description. The above-described descriptions of the various systems and methods may be used alone or in any combination thereof without departing from the scope of the invention. Although the description and figures may show a specific ordering of steps, it is to be understood that different orderings of the steps are also contemplated in the present disclosure. Likewise, one or more steps may be performed concurrently or partially concurrently. It is therefore intended to cover in the appended claims all such changes and modifications that are within the scope of this disclosure.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A method of counting pliable objects, the method comprising:
   capturing an inspection image of a plurality of pliable objects using a camera as the plurality of pliable objects passes into a field of view of the camera, wherein:
   the inspection image is a top view of the plurality of pliable objects;
   a non-uniform gap is present between adjacent pliable objects of the plurality of pliable objects; and
   each non-uniform gap is substantially represented by a first luminance value range and each pliable object is substantially represented by a second luminance value range in the inspection image;
   partitioning, by a processor, the inspection image into a plurality of windows traversing the inspection image;
   preparing the inspection image for image analysis by setting a background luminance value of the inspection image to within the second luminance value range that substantially represents the pliable objects;
   for each individual window of the plurality of windows, performing a blob extraction process to determine a plurality of blobs corresponding to regions within the inspection image having substantially the second luminance value range such that the plurality of blobs correspond to the plurality of pliable objects;

counting a number of blobs within each window of the plurality of windows; and providing a signal rejecting or accepting the plurality of pliable objects based at least in part on the number of blobs that are counted in one or more windows.

2. The method of claim 1, wherein the blob extraction process comprises a connected-component analysis.

3. The method of claim 2, wherein the connected-component analysis comprises a 4-way connectivity-component analysis or an 8-way connectivity-component analysis.

4. The method of claim 2, wherein the connected-component analysis comprises selecting a minimum area restriction and selecting a maximum area restriction for determining at least a portion of an individual blob of the plurality of blobs.

5. The method of claim 1, wherein preparing the inspection image for image analysis further comprises applying, by the processor, a top-hat filter to the inspection image.

6. The method of claim 1, further comprising:

determining a number of windows having a number of blobs that is equal to a target count; and providing a signal accepting the plurality of pliable objects when the number of windows is equal to or greater than a threshold value.

7. The method of claim 1, wherein a signal rejecting the plurality of pliable objects is provided when one or more windows of the plurality of windows has a number of blobs that is outside of a predetermined threshold range.

8. The method of claim 1, wherein the plurality of pliable objects comprises a plurality of feminine hygiene products.

9. The method of claim 1, wherein:

an edge of one or more pliable objects in the plurality of pliable objects is non-linear; and a thickness of each pliable object is less than 3 mm.

10. The method of claim 1, further comprising illuminating the plurality of pliable objects by a light source that emits light at one or more wavelengths to maximize a contrast between the plurality of pliable objects and the non-uniform gap that is present between adjacent pliable objects.

11. The method of claim 10, wherein the light emitted by the light source has a wavelength that corresponds to a red color.

12. A method of processing pliable objects comprising:

populating a package with a plurality of pliable objects according to a desired number of pliable objects, wherein each of the pliable objects of the plurality of pliable objects has a thickness and a length;

passing the package under a camera such that the plurality of pliable objects are within a field of view of the camera;

illuminating the package and the plurality of pliable objects;

capturing an inspection image of the plurality of pliable objects using the camera, wherein:

the inspection image is a top view of the plurality of pliable objects;

a non-uniform gap is present between adjacent pliable objects of the plurality of pliable objects; and each non-uniform gap is substantially represented by a first luminance value range and each pliable object is substantially represented by a second luminance value range in the inspection image;

partitioning, by a processor, the inspection image into a plurality of windows traversing the inspection image;

preparing the inspection image for image analysis by setting a background luminance value of the inspection image to within the second luminance value range that substantially represents the pliable objects;

for each individual window of the plurality of windows, performing a blob extraction process to determine a plurality of blobs corresponding to regions within the inspection image having substantially the second luminance value range such that the plurality of blobs correspond to the plurality of pliable objects;

counting a number of blobs within each window of the plurality of windows; and determining a number of windows of the plurality of windows having a number of blobs that is equal to a target count; and accepting the plurality of pliable objects when the number of windows is equal to or greater than a threshold value.

13. The method of claim 12, wherein the blob extraction process comprises a connected-component analysis.

14. The method of claim 13, wherein the connected-component analysis comprises a 4-way connectivity-component analysis or an 8-way connectivity-component analysis.

15. The method of claim 13, wherein the connected-component analysis comprises selecting a minimum area restriction and selecting a maximum area restriction for determining at least a portion of an individual blob of the plurality of blobs.

16. The method of claim 12, wherein preparing the inspection image for image analysis further comprises applying, by the processor, a top-hat filter to the inspection image.

17. A system for counting pliable objects comprising:

a camera;

a light source for illuminating the plurality of pliable objects;

a controller comprising a processor and a non-transitory memory device communicatively coupled to the processor, the non-transitory memory device storing machine-executable instructions that, when executed by the processor, causes the controller to:

provide an image capture signal to the camera that causes the camera to capture an inspection image of a top view of the plurality of pliable objects, wherein a non-uniform gap is present between adjacent pliable objects of the plurality of pliable objects, and each non-uniform gap is substantially represented by a first luminance value range and each pliable object is substantially represented by a second luminance value range in the inspection image;

partition the inspection image into a plurality of windows traversing the inspection image;

set a background luminance value of the inspection image to within the second luminance value range that substantially represents the pliable objects;

for each individual window of the plurality of windows, perform a blob extraction process to determine a plurality of blobs corresponding to regions within the inspection image having substantially the second luminance value range such that the plurality of blobs correspond to the plurality of pliable objects;

count a number of blobs within each widow of the plurality of windows; and provide a signal rejecting or accepting the plurality of pliable objects based at least in part on the number of blobs that are counted in one or more windows.

18. The system of claim 17, wherein the blob extraction process comprises a connected-component analysis.

19. The system of claim 18, wherein the connected-component analysis comprises selecting a minimum area restriction and selecting a maximum area restriction for determining at least a portion of an individual blob of the plurality of blobs.

20. The system of claim 17, wherein the machine-executable instructions further cause the controller to:
   determine a number of windows having a number of blobs that is equal to a target count; and
   provide a signal accepting the plurality of pliable objects when the number of windows is equal to or greater than a threshold value.

\* \* \* \* \*